United States Patent [19]

Stynes

[11] Patent Number: 4,462,966

[45] Date of Patent: Jul. 31, 1984

[54] FLUID DISTRIBUTOR MEANS

[75] Inventor: Peter C. Stynes, Bartlesville, Okla.

[73] Assignee: Phillips Petroleum Company, Bartlesville, Okla.

[21] Appl. No.: 377,748

[22] Filed: May 13, 1982

[51] Int. Cl.³ .............. B01J 8/02; B01D 25/30; B01D 29/42; B01D 57/00

[52] U.S. Cl. ..................... 422/220; 55/52; 55/199; 55/201; 210/456; 422/224; 422/310

[58] Field of Search ............. 422/195, 220, 191, 176, 422/310, 224, 225; 210/456; 55/46, 52, 178, 199, 201

[56] References Cited

U.S. PATENT DOCUMENTS

| | | | |
|---|---|---|---|
| 106,607 | 8/1870 | Mowbray | 422/225 X |
| 1,141,266 | 6/1915 | Raschig | 422/220 |
| 2,148,998 | 2/1939 | Sackett | 422/224 |
| 3,433,600 | 3/1969 | Christensen et al. | 422/195 X |
| 3,479,146 | 11/1969 | Hochman et al. | 422/220 |
| 3,498,755 | 3/1970 | Borre | 422/195 X |
| 3,598,542 | 8/1971 | Carson et al. | 422/195 X |
| 3,702,238 | 11/1972 | Armistead et al. | 422/195 X |
| 3,824,080 | 7/1974 | Smith et al. | 422/195 X |
| 4,292,274 | 9/1981 | Raitani et al. | 422/220 X |

Primary Examiner—Barry S. Richman

[57] ABSTRACT

A fluid distributor means for distributing a liquid-containing fluid on the surface of a confined body of material, such as, a body catalyst or clay, including, a vertical tubular fluid inlet terminating in a plurality of radially-disposed tubes, mounted above the body of material; an annular tray between the radially-disposed tubes and the body of material and surrounding the radially-disposed tubes, having upstanding inner and outer edges to prevent fluid flow from the edges and having apertures for the passage of fluid therethrough and a plurality of baffles, equal in number to the number of radially-disposed tubes, mounted on the tray in positions to intercept fluid discharged by the tubes. A layer of inert particulate material may be disposed on the body of material below the tray.

15 Claims, 2 Drawing Figures

FLUID DISTRIBUTOR MEANS

BACKGROUND OF THE INVENTION

The present invention relates to a fluid distributor means. A more specific aspect of the present invention relates to a vessel having a fluid distributor means adapted to distribute a fluid on the surface of a body of material disposed in the vessel.

In numerous industrial operations, it is desired to distribute a fluid over the surface of a confined body of material. For example, in the refining of oil, both in a conventional refinery and in a system for rerefining used oils, it is often desired to pass the oil through a body of clay to improve color and other properties of the oil. In such cases, the oil is distributed over the surface of the body of clay so as to trickle or flow downwardly through the body of clay and be removed from the bottom of the treating vessel. In conventional practice, a spray head or spray nozzle is adapted to discharge the oil as a diverging cone. However, numerous problems are involved in such distribution means, for example, such spray heads or nozzles are prone to plug easily, particularly with heavy fluids, such as heavy oils or oils which may contain suspended particles. Such spray heads and nozzles, particularly those adapted for use with heavy fluids, are also relatively expensive. While flow through such spray heads and nozzles can be improved to some extent by preheating the heavy fluid to make it less viscous, or by utilizing air or steam to assist distribution of the fluid by the nozzle, such practices involve additional costs for preheating the fluid, added expense of the fluid assist nozzles, added cost of the assist air or steam and, in many cases, contamination of reactants, treating agents or products by the assist air or steam. Further, the use of such spray heads or nozzles limits the height of the body of treating material which can be disposed in the vessel, to the extent that the top of the treating material must be disposed at a height such that the base of the cone-shaped spray extends over the entire surface of the body of treating material. It is also desirable in similar operations to thus treat a two-phase, liquid-gas by spraying the same over the surface of a bed of treating material. For example, in oil refining and rerefining operations, it is often desirable to hydrotreat the oil by spraying a mixture of oil and hydrogen over the surface of a body of catalytic material so as to permit the oil to pass downwardly through the body of catalytic material and be removed from the bottom of the vessel. In addition to the problems previously mentioned, such an operation involves the additional problem of disengaging the gas and the liquid phases so that two-phase flow problems through the body of catalytic material do not occur. Spray heads and spray nozzles heretofore utilized are not designed to solve this problem.

SUMMARY OF THE INVENTION

It is therefore an object of the present invention to provide an improved fluid distributor means which overcomes the above and other problems of the prior art. A further object of the present invention is to provide a fluid distributor means for distributing a fluid on the surface of a confined body of material. A still further object of the present invention is to provide an improved fluid distributor means which overcomes the problem of plugging. Another and further object of the present invention is to provide an improved fluid distributor means which effectively disengages gas and liquid from a two-phase, gas-liquid mixture. Yet another object of the present invention is to provide an improved fluid distributor means which requires limited vertical space for mounting in a vessel and therefore permits the deposition of a larger body of treating material in the vessel. A still further object of the present invention is to provide an improved fluid distributor means which is mounted in a vessel in a manner to permit ready access to the vessel. Still another object of the present invention is to provide an improved fluid distributor means which can be mounted in a pressure resistant vessel so as to permit maximum structural integrity of the vessel. These and other objects and advantages of the present invention will be apparent from the following description.

In accordance with the present invention, an improved fluid distributor means, for distributing a fluid on the surface of a confined body of material, includes a vertically-disposed, tubular fluid inlet means vertically mounted above the surface of the body of material and terminating in a plurality of generally, radially-disposed tubes having their peripheral ends open for discharge of the fluid, an annular tray means mounted between the radially-disposed tubes and the surface of the body of material, having a generally flat bottom, extending from a point adjacent the peripheral ends of the radially disposed tubes to a point adjacent the outer periphery of the surface of the body of material, having a plurality of passages therethrough of sufficient dimensions to pass the fluid therethrough and having upstanding inner and outer edges of sufficient height to prevent overflow of fluid disposed thereon, and a plurality of upstanding baffle means equal in number to the number of radially-disposed tubes mounted on top of the tray and having a height and being positioned so as to intercept fluid issuing from the ends of the radially-disposed tubes.

DESCRIPTION OF THE PREFERRED EMBODIMENTS

Figure 1:
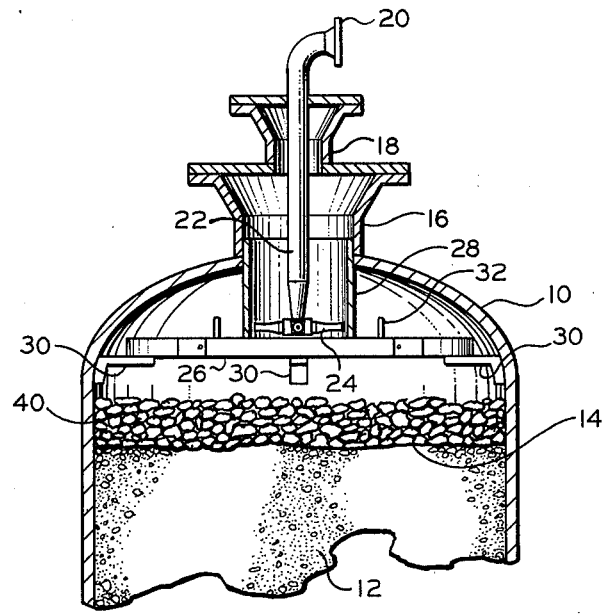
FIG. 1 is an elevational view, partially in section, of the fluid distributor means of the present invention mounted in a vessel.
Figure 2:
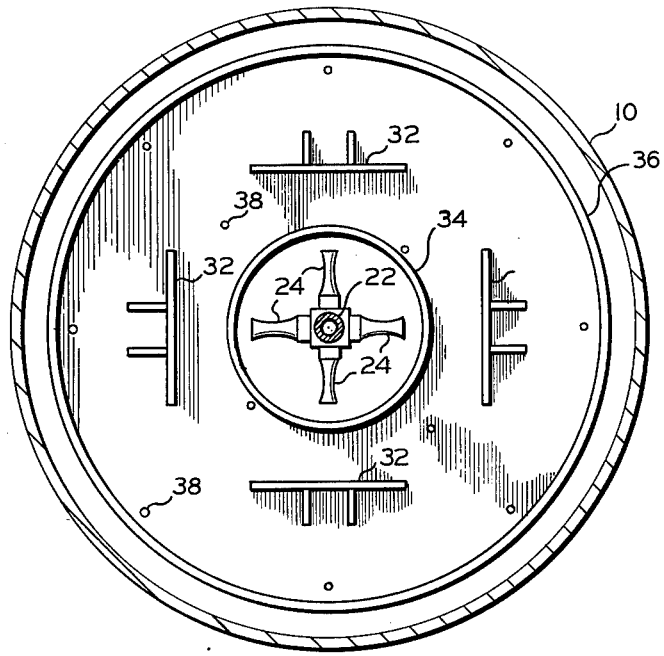
FIG. 2 of the drawings is a top view, partially in section, of the fluid distributor means of the present invention.

When utilized herein, the term "fluid" means any fluid having: a liquid as one component thereof, for example, a liquid, a vapor-liquid mixture, a gas-liquid mixture, a liquid with suspended solids, etc.

The term, "surface of a body of material", when utilized herein, shall mean a body of liquid, a body of solid particles, a body of solid particles suspended in a gas, a body of solid particles suspended in a liquid or combinations thereof which form a distinct upper surface as contrasted to gases or vapors alone which present no distinguishable surface.

The term, "passages", is meant to include any fluid transmitting means, including, without limitation, apertures, downcomers, risers, etc.

The present invention will be better understood by reference to the following description when read in conjunction with the drawings. While specific reference is made to a particular vessel, having the distributor means of the present invention mounted therein, for use in carrying out a specific process, it is to be understood that this is by way of description only and is not to be considered limiting.

In the Figures, the upper section of a pressure vessel 10, adapted to contain fluids under pressure, is shown. In the specific case, vessel 10 is a pressure vessel approximately 54 inches in diameter, adapted to carry out a catalytic process for hydrotreating hydrocarbon oils. Disposed in a lower portion of the vessel is a body of catlyst 12 having an upper surface 14. As previously indicated, the distributor means of the present invention can be utilized in any similar operation, such as clay treating hydrocarbon oils, etc., where a fluid is to be distributed on the surface of a confined body of material. Vessel 10 terminates at its upper end in a neck portion 16, which provides an opening for introduction and removal of materials, as well as serves as a manway for entry into the vessel for service, etc. In the specific example given, neck 16 has an internal diameter of about 18 inches. Mounted on neck 16 is a removable closure 18. Mounted within removable closure 18 and removable therewith is feed inlet means 20. In the specific example illustrated, feed inlet 20 is an inlet for a mixture of hydrocarbon oil and hydrogen. The lower end of feed inlet means 20, comprises: a vertically-disposed tubular fluid inlet means 22, which, in turn, terminates in a plurality of generally, radially-disposed tubes 24, in the specific case shown, four in number. The peripheral ends of radially-disposed tubes 24 are open and are of reduced diameter to increase the velocity of the fluid being discharged therefrom. Mounted in vessel 10 below the radially disposed tubes 24, but above the surface 14 of the confined body of material 12, is an annular tray means 26. In the specific case shown, tray means 26 is mounted in vessel 10 by a plurality of suspension elements 28. In the specific case shown, the suspension elements 28 are longitudinally cut sections of pipe which are welded to the interior of neck 16 of the vessel 10 and are attached to the inner ring of tray means 26. Alternatively, as is shown, instead of the suspension elements 28, the tray means 26 can be mounted in vessel 10 by a plurality of L-shaped brackets 30 attached to the inner walls of vessel 10 and the bottom of tray means 26. Attached to the upper surface of tray means 26 are a plurality of upstanding baffle means 32, equal in number to the number of radially-disposed tubes 24 and having a height and being positioned to as to intercept fluid and act as splash plates for fluid issuing from radially-disposed fluid inlet tubes 24. Where, as in the specific example, the fluid being discharged by the radially disposed fluid inlet tubes 24, is a mixture of gas and liquid, baffle means 32 serves to disengage the gas from the liquid, in addition to causing the liquid to fall to and be distributed on the upper surface of annular tray means 26. In order to prevent liquid disposed on the upper surface of annular tray means 26 from overflowing from the inner and outer edges of the tray means, tray means 26 is provided with upstanding inner and outer edges 34 and 36, respectively. In the specific case shown, the upstanding edges are simply upstanding flat rings. The bottom of tray means 26 has formed therein a plurality of apertures 38, which permit the liquid on the surface of tray means 26 to pass downwardly through the tray and thus be distributed over the surface 14 of the body of material 12. It is to be observed that the central opening of tray means 26 is of essentially the same internal diameter as neck 16 of vessel 10 and when removable closure 18 is removed from vessel 10 together with feed inlet means 20, clear access to the interior of vessel 10 is provided. Also shown, disposed on surface 14 of the body of material 12 between the surface 14 and tray means 26, is a layer of an inert, solid distributing elements 40. Inert distributing elements 40, in the specific case shown, are ceramic balls. Inert distributing elements 40 aid in the distribution of the feed liquid on surface 14 of the body of material 12. Thus, very small flow rates through relatively large holes 38 in tray means 26 can be utilized. In the event that larger flow rates are to be utilized, the number of holes 38 in tray means 26 can be increased and the inert distributing means 40 eliminated. It should also be observed, in connection with the fluid distributing means of the present invention, that it requires little space in the upper portion of the vessel 10, thus allowing for a greater depth of the body of material 12 in a given vessel size. This is in contrast to a spray head or nozzle, for introducing the feed material, wherein the base of the cone-shaped fluid spray must coincide with the surface 14 of the body of material 12. The latter, of course, requires that the surface 14 be lower than that shown and which is possible in connection with the present invention. Also of significance is the fact that, with the distributor means of the present invention, a single vessel opening can serve as a manway, material addition port and feed location. In addition, such a single upper opening allows for greater structural integrity of the vessel in high pressure service. The tray means 26 also can be installed and leveled only once during initial manufacture or installation and thereafter need not be removed or releveled for any purpose.

It is obvious from the above description that the distributor means of the present invention may also be applied to packed distillation columns and scrubbers, adsorption and absorption columns in general, columns for the concurrent or countercurrent contact of fluids, etc. The tray may be a tray with downcomers, risers, bubble caps, trays, etc., or any other tray-type structure where liquid is formed on a tray surface and passed from the top of the tray to a body of material below the tray. Leveling means may also be included in the tray supports. Many other variations, modifications and uses will be apparent to one skilled in the art without departing from the invention hereof.

While specific structures, specific processes, specific items of equipment and specific materials have been referred to herein, it is to be understood that these specifics are not to be by way of limitation but by way of illustration only.

That which is claimed is:

1. Fluid distributor means, for disassociating components of and distributing a fluid on the surface of a confined body of material, comprising:
    (a) vessel means containing said confined body of material;
    (b) vertically-disposed, tubular fluid inlet means disposed above said surface of the body of material and terminating at its lower end in a plurality of generally, radially-disposed tubes having their peripheral ends open for the discharge of said fluid;
    (c) annular tray means mounted between said radially-disposed tubes and said surface of the body of material, having a generally-flat bottom extending from a point adjacent to, but spaced from, the peripheral ends of said radially disposed tubes to a point adjacent the outer periphery of said surface of the body of material;

(d) said tray means having a plurality of passages formed through the bottom thereof of sufficient dimensions to pass said fluid therethrough;

(e) said tray means also having fluid impervious, upstanding inner and outer edges of sufficient height to prevent overflow of said fluid disposed thereon at the inner and outer edges of said tray means; and (f) a plurality of upstanding baffle means, equal in number to the number of radially-disposed tubes, mounted on top of the tray means and having a height and being positioned on said tray means so as to intercept and disassociate components of said fluid issuing from said peripheral ends of said radially-disposed tubes.

2. Fluid distributor means in accordance with claim 1 which, additionally, includes a body of inert, discreet, solid distributing elements disposed on the surface of the confined body of material below the tray means.

3. Fluid distributor means in accordance with claim 1 wherein the tubular fluid inlet means and the radially-disposed tubes are adapted to discharge a liquid.

4. Fluid distributor means in accordance with claim 1 wherein the tubular fluid inlet means and the radially-disposed tubes are adapted to discharge a liquid-gas mixture.

5. Fluid distributor means in accordance with claim 1 wherein the peripheral ends of the radially-disposed tubes have a reduced peripheral dimension to thus increase the velocity of the fluid issuing therefrom.

6. Fluid distributor means in accordance with claim 1 wherein the upstanding inner and outer edges of the tray means are vertically disposed annular rims.

7. Fluid distributor means in accordance with claim 1 wherein the baffle means are generally-flat plates disposed generally perpendicular to the outlet ends of the radially-disposed tubes.

8. Fluid distributor means in accordance with claim 1 wherein the surface of the confined body of material is a surface of a body of particulate solids.

9. Fluid distributor means in accordance with claim 8 wherein particulate solids are clay particles.

10. Fluid distributor means in accordance with claim 8 wherein the particulate solids are catalyst particles.

11. Fluid distributor means in accordance with claim 1 wherein the fluid distributor means is mounted in the upper end of a closed vessel.

12. Fluid distributor means in accordance with claim 11 wherein the closed vessel is adapted to retain fluids under pressure.

13. Fluid distributor means in accordance with claim 11 wherein the vessel is provided with a single, centrally-disposed opening in its upper end and additionally includes removable closure means.

14. Fluid distributor means in accordance with claim 13 wherein the tubular fluid inlet means and the radially disposed tubes are mounted in the removable closure means and are removable therewith.

15. Fluid distributor means in accordance with claim 13 wherein the central opening of the annular tray means coincides with the vessel opening and has essentially the same peripheral dimensions.

* * * * *